US007916689B2

(12) United States Patent
Jeong et al.

(10) Patent No.: US 7,916,689 B2
(45) Date of Patent: Mar. 29, 2011

(54) METHOD AND APPARATUS FOR TRANSMITTING/RECEIVING INFORMATION USING RANDOM ACCESS PROCEDURE IN MOBILE COMMUNICATION SYSTEM

(75) Inventors: Kyeong-In Jeong, Hwaseong-si (KR); Soeng-Hun Kim, Suwon-si (KR); Sung-Ho Choi, Suwon-si (KR); Gert-Jan Van Lieshout, Suwon-si (KR); Himke Van Der Velde, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 728 days.

(21) Appl. No.: 11/836,602

(22) Filed: Aug. 9, 2007

(65) Prior Publication Data
US 2008/0214193 A1 Sep. 4, 2008

(30) Foreign Application Priority Data

Aug. 9, 2006 (KR) .......................... 10-2006-0075332
Aug. 22, 2006 (KR) .......................... 10-2006-0079599

(51) Int. Cl.
H04Q 7/00 (2006.01)
(52) U.S. Cl. ....................................... 370/328; 370/462
(58) Field of Classification Search .................. 370/252, 370/328, 329, 338, 401, 462
See application file for complete search history.

(56) References Cited

U.S. PATENT DOCUMENTS

| | | | | |
|---|---|---|---|---|
| 6,631,269 B1 * | 10/2003 | Cave | ............................. | 455/450 |
| 7,123,628 B1 * | 10/2006 | Hwang et al. | ................. | 370/469 |
| 7,184,393 B1 * | 2/2007 | Singh et al. | ................... | 370/203 |
| 7,212,809 B2 * | 5/2007 | Khawand | ................... | 455/414.1 |
| 2002/0183074 A1 * | 12/2002 | Delaveau et al. | ............. | 455/456 |
| 2003/0076812 A1 | 4/2003 | Benedittis | | |
| 2004/0179498 A1 * | 9/2004 | Seguin | .......................... | 370/335 |
| 2007/0230600 A1 * | 10/2007 | Bertrand et al. | .............. | 375/260 |
| 2008/0253323 A1 * | 10/2008 | Fischer | .......................... | 370/329 |
| 2008/0267126 A1 * | 10/2008 | Vujcic et al. | .................. | 370/330 |
| 2008/0298325 A1 * | 12/2008 | Vujcic | .......................... | 370/336 |
| 2009/0011769 A1 * | 1/2009 | Park et al. | ..................... | 455/450 |
| 2009/0290509 A1 * | 11/2009 | Vujcic et al. | .................. | 370/254 |

FOREIGN PATENT DOCUMENTS

EP 1 143 754 10/2001

\* cited by examiner

*Primary Examiner* — Ricky Ngo
*Assistant Examiner* — Christine Ng
(74) *Attorney, Agent, or Firm* — The Farrell Law Firm, P.C.

(57) ABSTRACT

Disclosed is a method and an apparatus for transmitting and receiving additional information through a random access procedure by mapping at least one additional information element to random access codes to be used in a random access procedure between a UE and an ENB in a mobile communication system. According to the method, a random access code selected based on additional information to be transmitted and a triggering cause of the random access procedure is transmitted from the UE to the ENB. Each random access code is differently mapped to at least one additional information element according to a class of a cause for which a corresponding random access procedure is triggered, and the additional information elements are mapped to different ranges of random access codes according to the classes of the cause.

30 Claims, 7 Drawing Sheets

METHOD AND APPARATUS FOR TRANSMITTING/RECEIVING INFORMATION USING RANDOM ACCESS PROCEDURE IN MOBILE COMMUNICATION SYSTEM

PRIORITY

This application claims priority under 35 U.S.C. §119(a) to applications entitled "Method And Apparatus For Transmitting/Receiving Information Using Random Access Procedure In Mobile Communication System" filed in the Korean Industrial Property Office on Aug. 9, 2006 and Aug. 22, 2006 and respectively assigned Serial Nos. 2006-75332 & 2006-79599, the contents of both of which are incorporated herein by reference.

BACKGROUND OF THE INVENTION

1. Field of the Invention

The present invention relates generally to a mobile communication system, and more particularly to a method and an apparatus for transmitting and receiving information using a random access code in a random access procedure.

2. Description of the Related Art

A Universal Mobile Telecommunication Service (UMTS) system is a $3^{rd}$ Generation (3G) asynchronous mobile communication system, which uses wideband Code Division Multiple Access (CDMA) and is based on Global System for Mobile Communications (GSM) and General Packet Radio Services (GPRS), which are European mobile communication systems. In the third generation Partnership Project (3GPP), which is in charge of standardization of the UMTS, active discussion is underway regarding Long Term Evolution (LTE) of the UMTS system. The LTE is a technology which targets commercialization thereof by the year 2010 and the realization of high speed packet-based communication at about 100 Mbps. To this end, various schemes are being discussed, such as reducing the number of nodes located in communication paths by simplifying the structure of a network, and approaching a wireless protocol to a wireless channel as much as possible.

FIG. 1 illustrates a conventional evolved UMTS mobile communication system. As shown, an Evolved Radio Access Network (E-RAN) 110 or 112 has a simplified 2 node structure, which includes Evolved Node Bs (ENBs) 120, 122, 124, 126 and 128 and Anchor Nodes 130 and 132. A User Equipment (UE) 101 is connected to an Internet Protocol (IP) network 114 through the E-RANs 110 and 112.

The ENBs 120 to 128 correspond to legacy Node Bs of the UMTS system and are connected to the UE 101 through a wireless channel. The ENBs 120 to 128 perform more complex functions than the legacy Node B. In the LTE, all user traffic including the real-time service, such as Voice over IP (VoIP) using the Internet protocol, is provided through a shared channel. Therefore, the LTE requires an apparatus for collecting status information of UEs and performing scheduling by using the collected information. The ENBs 120 to 128 control of the scheduling.

Usually, one ENB controls a plurality of cells and performs Adaptive Modulation and Coding (AMC), which determines a modulation scheme and a channel coding rate in accordance with the channel status of a UE. As in the High Speed Uplink Packet Access (HSUPA; which is also called "Enhanced Dedicated Channel (E-DHC)") and the High Speed Downlink Packet Access (HSDPA) of the UMTS, the Hybrid Automatic Repeat Request (HARQ) is performed between the ENBs 120 to 128 and the UE 101 in the LTE.

Because it is impossible for only the HARQ to satisfy requirements for various Qualities of Service (QoSs), an outer Automatic Repeat Request (ARQ) in a higher layer may be performed between the UE 101 and the ENBs 120 to 128. The HARQ process refers to soft-combining previously-received data with retransmitted data without discarding the previously-received data, thereby improving the ratio of success in the reception, and is used to improve the transmission efficiency in the high speed packet communication, such as the HSDPA and the Enhanced Dedicated Channel (EDCH). In order to implement a maximum transmission speed of 100 Mbps, the LTE is expected to use Orthogonal Frequency Division Multiplexing (OFDM) in 20 MHz bandwidth as wireless connection technology.

In a mobile communication system such as the UMTS and the LTE, a Random Access (RA) procedure is used when a UE in a Radio Resource Control (RRC) idle mode or RRC-connected mode acquires UpLink (UL) timing synchronization with an ENB, and/or sets initial uplink transmission power, and/or requests an ENB or a higher (anchor) node to transmit an (initial) uplink message. The RRC idle mode and the RRC-connected mode are defined in the TR25.813 v700 standard of the 3GPP. In general, a status in which the ENB does not possess context information of a UE and controls location of a UE based on each Routing Area (RA) or Tracking Area (TA) for paging instead of controlling location of a UE based on each cell is called "an RRC idle mode", and a status in which the ENB possesses context information of a UE, has an RRC connection set between the UE and the ENB, and can control location of a UE based on each cell, is called "an RRC-connected mode".

The conventional random access procedure as described above requires technology for efficiently transmitting a message while preventing random access collision between UEs.

SUMMARY OF THE INVENTION

Accordingly, the present invention has been made to solve the above-mentioned problems occurring in the prior art, and provides a method and an apparatus for transmitting information using a random access code of a random access procedure in a mobile communication system.

The present invention provides a method and an apparatus for mapping at least one of a random identifier, channel quality information and a message size to a random access code of a random access procedure and transmitting the mapped code in a mobile communication system.

The present invention provides a method and an apparatus for receiving at least one of a random identifier, channel quality information and a message size transmitted after being mapped to a random access code of a random access procedure in a mobile communication system.

In accordance with an aspect of the present invention, there is provided a method for transmitting information through a random access procedure in a mobile communication system, including setting a cause value according to an object for which the random access procedure is triggered, determining at least one additional information element to be notified through the random access procedure based on a class of the cause from among classes of the cause, selecting a random access code mapped to the cause and the determined additional information element by referring to a random access code table, and transmitting the random access code to an Evolved Node B (ENB) through a random access channel, wherein, in the random access code table, random access codes belonging to a first class from among the classes of the cause and random access codes belonging to a second class are mapped to different combinations of additional information elements, and first additional information elements from among the mapped additional information elements are mapped with different ranges to the random access codes belonging to the first class and the random access codes belonging to the second class.

In accordance with the present invention, there is provided a method for receiving information through a random access procedure in a mobile communication system, including receiving a random access code through a random access channel from a UE, analyzing the random access code by referring to a random access code table, thereby extracting at least one information element and a cause indicated by the random access code, determining scheduling information for transmission of the initial uplink message based on the at least one information element and the cause, and transmitting the scheduling information to the UE, wherein, in the random access code table, random access codes belonging to a first class from among classes of the cause and random access codes belonging to a second class are mapped to different combinations of additional information elements, and first additional information elements from among the mapped additional information elements are mapped with different ranges to the random access codes belonging to the first class and the random access codes belonging to the second class.

In accordance with the present invention, there is provided a UE apparatus for transmitting information through a random access procedure in a mobile communication system, including a cause setting unit for, when the random access procedure is triggered, setting a cause value according to an object for which the random access procedure is triggered, an additional information setting unit for determining at least one additional information element to be notified through the random access procedure based on a class of the cause from among predetermined classes of the cause, a random access code selection unit for selecting a random access code mapped to the additional information element and the cause by referring to a predetermined random access code table, and a transmitter for transmitting the random access code to an Evolved Node B (ENB) through a random access channel, wherein, in the random access code table, random access codes belonging to a first class from among the classes of the cause and random access codes belonging to a second class are mapped to different combinations of additional information elements, and first additional information elements from among the mapped additional information elements are mapped with different ranges to the random access codes belonging to the first class and the random access codes belonging to the second class.

In accordance with the present invention, there is provided an ENB apparatus for receiving information through a random access procedure in a mobile communication system, including a receiver for receiving a random access code through a random access channel from a UE, a random access code analysis unit for analyzing the random access code by referring to a predetermined random access code table, thereby extracting at least one information element and a cause indicated by the random access code, and a scheduler for determining scheduling information for transmission of the initial uplink message based on the at least one information element and the cause, wherein, in the random access code table, random access codes belonging to a first class from among classes of the cause and random access codes belonging to a second class are mapped to different combinations of additional information elements, and first additional information elements from among the mapped additional information elements are mapped with different ranges to the random access codes belonging to the first class and the random access codes belonging to the second class.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description, a detailed description of known functions and configurations incorporated herein will be omitted for the sake of clarity and conciseness. Further, various specific definitions found in the following description are provided only to help general understanding of the present invention, and it will be apparent to those skilled in the art that the present invention can be implemented without such definitions.

The present invention discloses a scheme for providing a random access procedure in a mobile communication system, specifically, a scheme for efficiently transmitting additional information by using a random access code.

In the following description, an LTE system evolved from a UMTS system using an asynchronous Wideband Code Division Multiple Access (WCDMA) communication scheme is discussed as an example. However, the method of transmitting information by using a random access code, which is the main idea of the present invention, can be applied without departing from the scope of the present invention to other types of mobile communication systems having similar technological background and similar channel types only with slight modification, which can be understood by one skilled in the art.

Figure 1:
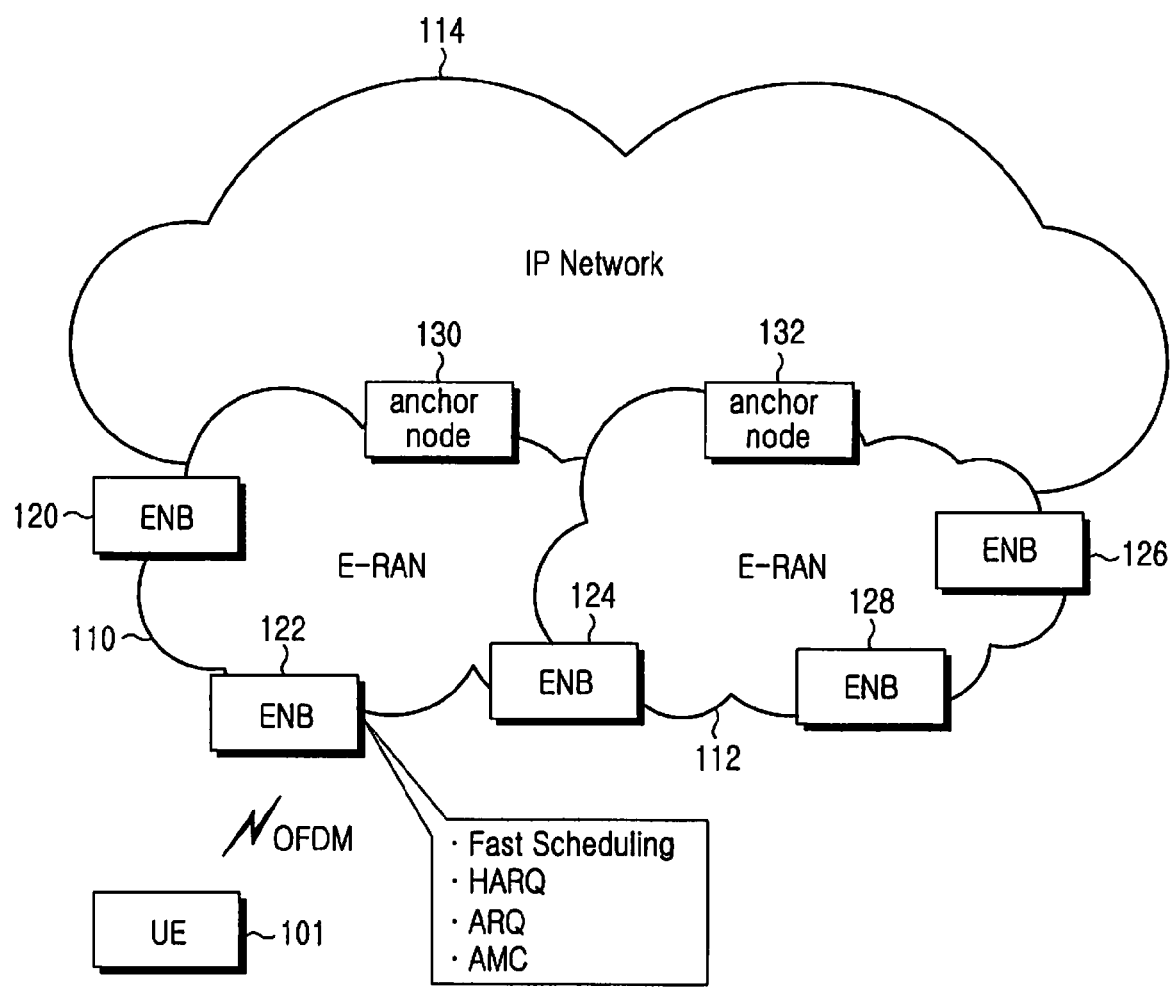
FIG. 1 illustrates a conventional mobile communication system.
Figure 2:
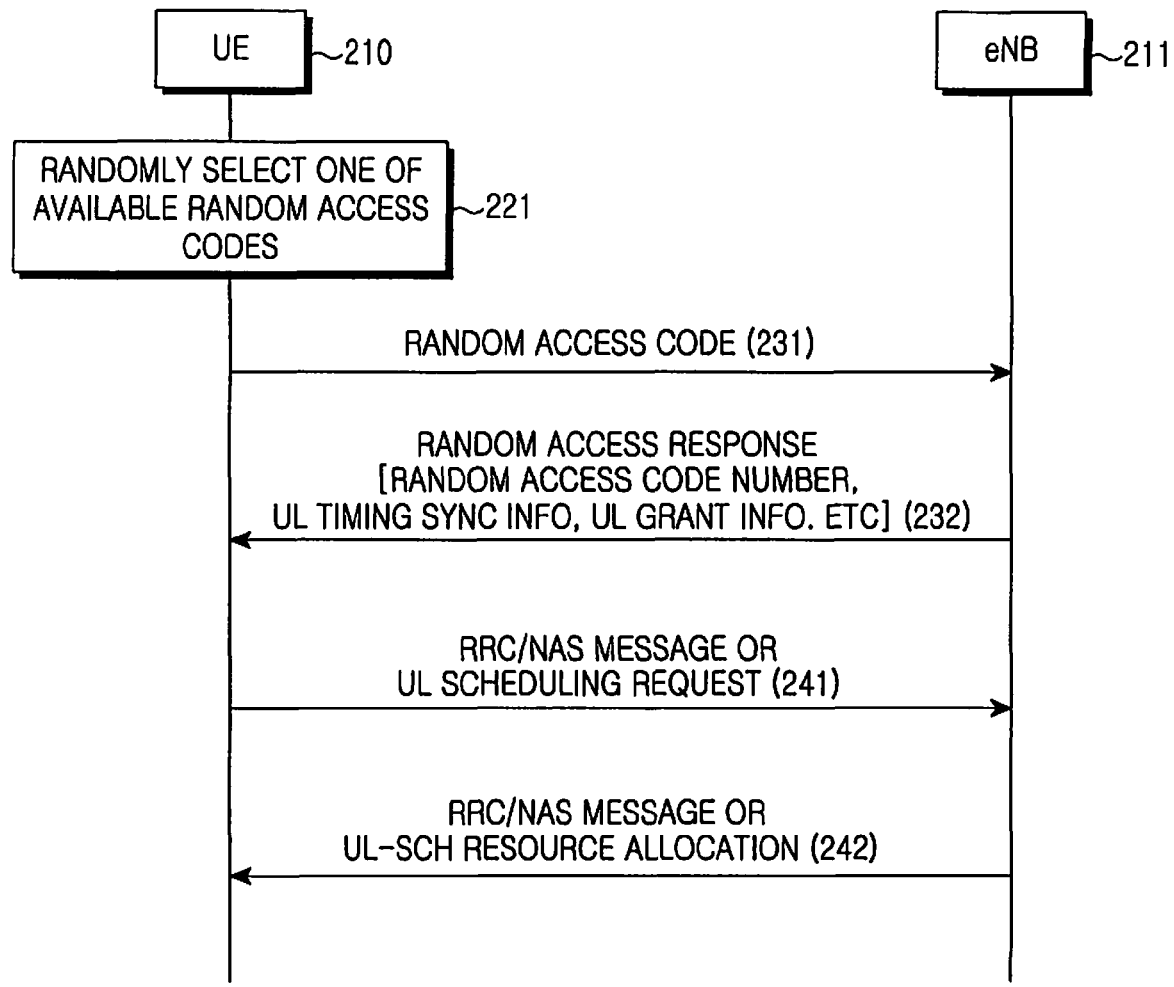
FIG. 2 is a signaling flow diagram for illustrating a random access procedure in a mobile communication system.

FIG. 2 illustrates a random access procedure in a mobile communication system, wherein reference numeral 210 denotes a User Equipment (UE) 210 and reference numeral 211 denotes an ENB 211 controlling a cell in which the UE 210 is located. Hereinafter, described will be an operation of the UE 210 when it shifts from an RRC idle mode to an RRC-connected mode in order to start a call.

Referring to FIG. 2, the UE 210 randomly selects one of available random access codes within the cell in step 221 and then transmits the selected random access code through a channel/time in step 231. The ENB 211 receives the random access code, calculates uplink timing sync with the UE and reports calibration information for the uplink timing synchronization to the UE 210 through a random access response in step 232. As used herein, the random access response includes a random access code number indicating the random access code received in step 231 from among the available random access codes within the cell, UpLink (UL) timing sync information indicating the calibration information and uplink resource allocation (or grant) information for transmission of the uplink message.

In step 241, when the random access response includes a random access code number mapped to the random access code received in step 231, the UE 210 calibrates the uplink transmission timing by using the uplink transmission timing sync information and transmits an initial uplink message by using channel/time indicated by the uplink resource allocation information. The initial uplink message may be a Radio Resource Control (RRC) message having the ENB as the protocol destination, a Non Access Stratum (NAS) message having an anchor node as the destination, or a combined message (RRC/NAS message) including an RRC message and an NAS message combined therein. As another example, the initial uplink message may include UL scheduling information of an Layer 2 (L2) Multiple Access Control (MAC) layer for requesting more specific uplink resource allocation. In step 242, the ENB 211 transmits an uplink resource allocation message for Uplink Shared Channel (UL-SCH) or the RRC/NAS message as a response to the initial uplink message.

In the random access procedure as described above, the ENB 211 having received the random access code 231 sets an initial AMC level for transmission of the initial uplink message and allocates radio resources (channel/time) according to the set AMC level and the size of the initial uplink message. As used herein, the AMC level is an index indicating a combination of a modulation scheme and channel coding rate. If discrimination between the random access codes is possible only for preventing random access contention between UEs within the cell and the UE 210 just randomly selects one random access code, the ENB 211 cannot allocate an optimized uplink resource for transmission of the initial uplink message 241. This is because the random access code randomly selected and transmitted by the UE 210 does not include any additional information about the initial uplink message and the channel state of the UE 210. However, because the number of available random access codes within the cell is limited due to problems, such as limited transmission power of the UE and the reduced interference level within the cell, the quantity of information that can be transmitted by using the random access codes is also limited.

Therefore, the present invention discloses efficient transmission of information necessary for transmission of the initial uplink message by using the limited available random access codes. That is, the present invention discloses efficient design of information mapped to each random access code.

Representative information that needs to be transmitted using random access codes in order to efficiently schedule the transmission of the initial uplink message without contention between UEs includes "cause", "message size", "random identifier (ID)" and "Channel Quality Information (CQI)". The "cause" refers to an object for performing the random access procedure, which may indicate the type of an initial uplink message transmitted next through the uplink. The "message size" indicates the size of the initial uplink message transmitted next through the uplink. The "random ID" indicates a temporary identifier information of a UE for reducing contention between UEs and the "CQI" indicates a current downlink channel state of a UE.

From the "cause", the ENB can recognize the type of the initial uplink message transmitted next through the uplink and can understand the size of the initial uplink message. As another example, the "message size" instead of the "cause" may be used as the information mapped to the random access codes. Table 1 below shows an example of a result obtained by mapping the above-mentioned information elements to the random access codes by a fixed assignment method. The example shown in Table 1 corresponds to mapping 6 bits of available random access codes within the cell to 3 bits of "cause", 2 bits of "random ID", and 1 bit of "CQI".

TABLE 1

| Cause Value | Random ID | CQI | Random access preamble number |
|---|---|---|---|
| A | 0 | 0 | random access code#0 |
| B | 1 | 1 | random access code#1 |
| C | 2 | 0 | random access code#2 |
| D | 3 | 1 | random access code#3 |
| E | 0 | 0 | random access code#4 |
| F | 1 | 1 | random access code#5 |
| G | 2 | 0 | random access code#6 |
| H | 3 | 1 | random access code#7 |
| A | 0 | 0 | random access code#8 |
| B | 1 | 1 | random access code#9 |
| C | 2 | 0 | random access code#10 |
| D | 3 | 1 | random access code#11 |
| E | 0 | 0 | random access code#12 |
| F | 1 | 1 | random access code#13 |
| G | 2 | 0 | random access code#14 |
| H | 3 | 1 | random access code#15 |
| A | 0 | 0 | random access code#16 |
| B | 1 | 1 | random access code#17 |
| C | 2 | 0 | random access code#18 |
| D | 3 | 1 | random access code#19 |
| E | 0 | 0 | random access code#20 |
| F | 1 | 1 | random access code#21 |
| G | 2 | 0 | random access code#22 |
| H | 3 | 1 | random access code#23 |
| A | 0 | 0 | random access code#24 |
| B | 1 | 1 | random access code#25 |
| C | 2 | 0 | random access code#26 |
| D | 3 | 1 | random access code#27 |
| E | 0 | 0 | random access code#28 |
| F | 1 | 1 | random access code#29 |
| G | 2 | 0 | random access code#30 |
| H | 3 | 1 | random access code#31 |
| A | 0 | 0 | random access code#32 |
| B | 1 | 1 | random access code#33 |
| C | 2 | 0 | random access code#34 |
| D | 3 | 1 | random access code#35 |
| E | 0 | 0 | random access code#36 |
| F | 1 | 1 | random access code#37 |
| G | 2 | 0 | random access code#38 |
| H | 3 | 1 | random access code#39 |
| A | 0 | 0 | random access code#40 |
| B | 1 | 1 | random access code#41 |
| C | 2 | 0 | random access code#42 |
| D | 3 | 1 | random access code#43 |
| E | 0 | 0 | random access code#44 |
| F | 1 | 1 | random access code#45 |
| G | 2 | 0 | random access code#46 |
| H | 3 | 1 | random access code#47 |
| A | 0 | 0 | random access code#48 |
| B | 1 | 1 | random access code#49 |
| C | 2 | 0 | random access code#50 |
| D | 3 | 1 | random access code#51 |
| E | 0 | 0 | random access code#52 |
| F | 1 | 1 | random access code#53 |
| G | 2 | 0 | random access code#54 |
| H | 3 | 1 | random access code#55 |
| A | 0 | 0 | random access code#56 |

TABLE 1-continued

| Cause Value | Random ID | CQI | Random access preamble number |
|---|---|---|---|
| B | 1 | 1 | random access code#57 |
| C | 2 | 0 | random access code#58 |
| D | 3 | 1 | random access code#59 |
| E | 0 | 0 | random access code#60 |
| F | 1 | 1 | random access code#61 |
| G | 2 | 0 | random access code#62 |
| H | 3 | 1 | random access code#63 |

When the information elements to be transmitted are mapped to random access codes in the manner as shown in Table 1, at times it may be impossible to optimize the number of transmitted information elements according to the scenario for transmitting the message. For example, when there is no random access contention between UEs in a scenario for transmitting an initial uplink message, it is undesirable to transmit the "random ID" by using 2 bits of the random access codes. At this time, if the size of the initial uplink message is large, it is more efficient to add the above 2 bits to the "CQI" for allocation of radio resources and setup of an AMC level of the initial uplink message by the ENB.

In contrast, if the size of the initial uplink message is small, it is undesirable to transmit the 1 bit of "CQI" by using the random access code. This is because the implication is that the gain in the radio resources, which can be saved by transmitting the 1 bit of "CQI", is not large. If contention may occur between UEs when the initial uplink message is transmitted, addition of the 1 bit to the "random ID" can reduce the contention between the UEs.

Therefore, the present invention changes the type and range of transmitted information mapped to the random access codes of the "cause" based on the "cause" for the transmission of the random access codes, thereby optimizing the information transmitted by using the random access codes according to the scenarios. If the object of the random access procedure expressed by the first "cause" of the random access code has a high probability of contention, the "random ID" is mainly set as the information mapped to the random access codes corresponding to the first "cause". That is, different random IDs are mapped to a larger number of random access codes from among the random access codes corresponding to the first "cause".

If the size of the initial uplink message corresponding to the second "cause" of the random access code is large, the "CQI" is mainly set as the information mapped to the random access codes corresponding to the second "cause". That is, different CQIs are mapped to a larger number of random access codes from among the random access codes corresponding to the second "cause". At this time, if the ENB roughly estimates an uplink channel state by using a "CQI" indicating a reception Signal to Noise Ratio (SNR) measured for a downlink pilot and performs scheduling (e.g., ACM level setup and resource allocation) for transmission of an initial uplink message based on the estimated uplink channel state, and if the size of the initial uplink message is large, the information mapped to the random access codes corresponding to the second "cause" is mainly set to be the "CQI".

Here, the "CQI" is reported as a value reflecting fast fading. However, because the fast fading independently occurs in the downlink and the uplink, the "CQI" may be improper for use in estimating the uplink channel state and then performing scheduling for transmission of the initial uplink message. Therefore, according to the present invention, "path loss" information may be used instead of the "CQI". The "path loss" information has a value obtained in a long term determined by the antenna pattern, shadowing (slow fading), propagation loss, for example, which are similar both in the downlink and in the uplink. Therefore, in order to estimate the uplink channel state and then perform scheduling (such as AMC scheduling) for transmission of the initial uplink message, the "path loss" may be more proper than the "CQI". That is, the "CQI" and the "path loss" are parameters usable for estimation of the uplink channel state, which can be replaced by each other. Therefore, those parameters can be properly selected either according to the condition or optionally by a system designer.

An embodiment of the present invention illustrated and described hereinafter corresponds to when the ENB performs scheduling for transmission of an initial uplink message by roughly estimating the uplink channel state by using the "CQI". However, the "path loss" instead of the "CQI" is used for estimation of the uplink channel state and scheduling for transmission of an initial uplink message. In that case, the "CQI" in the following description/illustration shall be replaced by the "path loss".

The following specific embodiment can be derived from the method disclosed above. The classes of the "cause" described below are just an example, to which the present invention is not limited.

(1) class #1 of "cause": there is little or no possibility of random access contention between UEs and the size of a corresponding initial uplink message is relatively large in comparison with other causes.→the "CQI" is mainly mapped to the random access codes belonging to the "cause" of class #1.

(2) class #2 of "cause": there is little or no possibility of random access contention between UEs and the size of a corresponding initial uplink message is relatively small in comparison with other causes.→the "random ID" or "CQI" is mainly mapped to the random access codes belonging to the "cause" of class #2. Therefore, the gain of radio resources due to setting of a proper AMC level is small even when a detailed "CQI" is given, and the "random ID" is mainly mapped.

(3) class #3 of "cause": there is a high possibility of random access contention between UEs or the contention may frequently occur, and the size of a corresponding initial uplink message is relatively large in comparison with other causes.→the "random ID" or "CQI" is mainly mapped to the random access codes belonging to the "cause" of class #3. Particularly, because it is impossible to disregard the possibility of contention between UEs having similar channel states, the "random ID" is mainly mapped.

(4) class #4 of "cause": there is a high possibility of random access contention between UEs or the contention may frequently occur, and the size of a corresponding initial uplink message is relatively small in comparison with other causes.→the "random ID" is mainly mapped to the random access codes belonging to the "cause" of class #4.

If the random access codes include information other than the information (hereinafter main information) mainly mapped in items (1) to (4), the other information is mapped to a smaller number of random access codes with a lower priority than the main information. Tables 2 and 3 are obtained by mapping the random access codes and additional information according to the present invention. Table 2 corresponds to when there are 4 bits of available random access codes within a cell, and Table 3 corresponds to when there are 6 bits of available random access codes within the cell. The present invention does not exclude the possibility that mapping of the random access codes and the additional information may be different from Table 2 and Table 3 according to embodiments or rules of the present invention.

TABLE 2

| 'Cause' | 'random ID' | 'CQI' | random access code # |
|---|---|---|---|
| Detach to active | X | 0 | random access code#0 |
| Detach to active | X | 1 | random access code#1 |
| Service Request | X | 0 | random access code#2 |
| Service Request | X | 1 | random access code#3 |
| Service Request | X | 2 | random access code#4 |
| UL Sync request only | 0 | X | random access code#5 |
| UL Sync request only | 1 | X | random access code#6 |
| UL Sync request only | 2 | X | random access code#7 |
| RAU | 0 | X | random access code#8 |
| RAU | 1 | X | random access code#9 |
| RAU | 2 | X | random access code#10 |
| HO | 0 | X | random access code#11 |
| HO | 1 | X | random access code#12 |
| HO | 2 | X | random access code#13 |
| Other L2/RRC/NAS transmission | 0 | X | random access code#14 |
| Other L2/RRC/NAS transmission | 1 | X | random access code#15 |

In Table 2, "Detach to active", "Service Request", "UL Sync request only", "RAU (Routing Area Update)", "HO (Handover)" and "Other L2/RRC/NAS transmission" are disclosed as "cause". The "Detach to active" indicates that, when a UE is powered on, a random access procedure is triggered for a process of attachment to a system, such as registration of UE context information and service context information in the system by the UE and extraction of an IP address by the UE. The "Service Request" indicates that a random access procedure is triggered so that a UE shifts from an RRC mode to an RRC-connected mode due to service starting, for example, transmits RRC context information of the UE to the ENB, and requests a service to a higher network node. The "UL Sync request only" indicates that a random access procedure is triggered only for acquisition of an uplink timing synchronization by a UE in the RRC idle mode or the RRC-connected mode. The above three causes do not indicate transmission of the initial uplink message. Therefore, even when receiving a random access code corresponding to one of the three causes, the ENB need not allocate uplink resources.

The "RAU" indicates a random access procedure for registering a changed Routing Area (RA) when the RA, which is a tracking area of paging, changes while a UE in the RRC idle mode moves. The "HO" indicates a random access procedure for notifying completion of handover to a target cell when handover to the target cell due to movement of a UE in an RRC-connected mode has been completed. The "Other L2/RRC/NAS transmission" indicates a random access procedure for transmission of an RRC/NAS message or other transmissible scheduling request messages of layer 2.

That is, Table 2 classifies the "cause" as below. The classes of (1) to (4) described below are based on the rule described above.

(1) class #1 of "cause": "Detach to active", "Service Request" ("Other L2/RRC/NAS transmission").

(2) class #2 of "cause": "HO", "UL Sync request only", "Other L2/RRC/NAS transmission".

(3) class #3 of "cause":

(4) class #4 of "cause": "RAU" ("HO", "UL Sync request only").

Therefore, in Table 2, the random access codes belonging to the "cause" of "Detach to active" and "Service Request" are defined to indicate the "CQI" without the "random ID", and the random access codes belonging to the "cause" of "RAU", "HO", "UL Sync request only", and "Other L2/RRC/NAS transmission" are defined to indicate the "random ID" without the "CQI". According to another embodiment in which the "Other L2/RRC/NAS transmission" belongs to class #1 of "cause", the random access codes belonging to the "cause" of the "Other L2/RRC/NAS transmission" are set to mainly indicate the "CQI".

TABLE 3

| "Cause" | "random ID" | "CQI" | "message size" | random access code# |
|---|---|---|---|---|
| Detach to active | 0 | 0 | X | random access code#0 |
| Detach to active | 0 | 1 | X | random access code#1 |
| Detach to active | 0 | 2 | X | random access code#2 |
| Detach to active | 0 | 3 | X | random access code#3 |
| Detach to active | 0 | 4 | X | random access code#4 |
| Detach to active | 0 | 5 | X | random access code#5 |
| Detach to active | 1 | 0 | X | random access code#6 |
| Detach to active | 1 | 1 | X | random access code#7 |
| Detach to active | 1 | 2 | X | random access code#8 |
| Detach to active | 1 | 3 | X | random access code#9 |
| Detach to active | 1 | 4 | X | random access code#10 |
| Detach to active | 1 | 5 | X | random access code#11 |
| Service Request | 0 | 0 | X | random access code#12 |
| Service Request | 0 | 1 | X | random access code#13 |
| Service Request | 0 | 2 | X | random access code#14 |
| Service Request | 0 | 3 | X | random access code#15 |
| Service Request | 0 | 4 | X | random access code#16 |
| Service Request | 0 | 5 | X | random access code#17 |
| Service Request | 1 | 0 | X | random access code#18 |
| Service Request | 1 | 1 | X | random access code#19 |
| Service Request | 1 | 2 | X | random access code#20 |
| Service Request | 1 | 3 | X | random access code#21 |
| Service Request | 1 | 4 | X | random access code#22 |
| Service Request | 1 | 5 | X | random access code#23 |
| UL Sync request only | 0 | X | X | random access code#24 |
| UL Sync request only | 1 | X | X | random access code#25 |
| UL Sync request only | 2 | X | X | random access code#26 |
| UL Sync request only | 3 | X | X | random access code#27 |
| UL Sync request only | 4 | X | X | random access code#28 |
| UL Sync request only | 5 | X | X | random access code#29 |
| UL Sync request only | 6 | X | X | random access code#30 |
| UL Sync request only | 7 | X | X | random access code#31 |
| RAU | 0 | X | X | random access code#32 |

TABLE 3-continued

| "Cause" | "random ID" | "CQI" | "message size" | random access code# |
|---|---|---|---|---|
| RAU | 1 | X | X | random access code#33 |
| RAU | 2 | X | X | random access code#34 |
| RAU | 3 | X | X | random access code#35 |
| RAU | 4 | X | X | random access code#36 |
| RAU | 5 | X | X | random access code#37 |
| RAU | 6 | X | X | random access code#38 |
| RAU | 7 | X | X | random access code#39 |
| HO | 0 | X | X | random access code#40 |
| HO | 1 | X | X | random access code#41 |
| HO | 2 | X | X | random access code#42 |
| HO | 3 | X | X | random access code#43 |
| HO | 4 | X | X | random access code#44 |
| HO | 5 | X | X | random access code#45 |
| HO | 6 | X | X | random access code#46 |
| HO | 7 | X | X | random access code#47 |
| Other L2/RRC/NAS transmission | 0 | X | 0 | random access code#48 |
| Other L2/RRC/NAS transmission | 0 | X | 1 | random access code#49 |
| Other L2/RRC/NAS transmission | 0 | 0 | 2 | random access code#50 |
| Other L2/RRC/NAS transmission | 0 | 1 | 2 | random access code#51 |
| Other L2/RRC/NAS transmission | 0 | 2 | 2 | random access code#52 |
| Other L2/RRC/NAS transmission | 0 | 0 | 3 | random access code#53 |
| Other L2/RRC/NAS transmission | 0 | 1 | 3 | random access code#54 |
| Other L2/RRC/NAS transmission | 0 | 2 | 3 | random access code#55 |
| Other L2/RRC/NAS transmission | 1 | X | 0 | random access code#56 |
| Other L2/RRC/NAS transmission | 1 | X | 1 | random access code#57 |
| Other L2/RRC/NAS transmission | 1 | 0 | 2 | random access code#58 |
| Other L2/RRC/NAS transmission | 1 | 1 | 2 | random access code#59 |
| Other L2/RRC/NAS transmission | 1 | 2 | 2 | random access code#60 |
| Other L2/RRC/NAS transmission | 1 | 0 | 3 | random access code#61 |
| Other L2/RRC/NAS transmission | 1 | 1 | 3 | random access code#62 |
| Other L2/RRC/NAS transmission | 1 | 2 | 3 | random access code#63 |

In Table 3, the classes of "cause" are the same as those in Table 2. Because the random access codes have a length of 6 bits, it is possible to use a larger number of random access codes than those in Table 2 and to more flexibly map additional information elements which are combined in the same or different manner according to the random access codes. For example, the random access codes belonging to the "cause" of "Detach to active" and "Service Request" are mainly mapped to the "CQI", and then are secondarily mapped to the "random ID". The "CQI" has a size of 6 bits and the "random ID" has a size of 2 bits, and the "CQI" first and mainly proceeds and then the "random ID" secondarily proceeds in the priority in the quantity of information.

For the same reason as in Table 2, only the "random ID" is mapped to the random access codes belonging to the "cause" of "UL Sync request only", "RAU", and "HO". In contrast with Table 2, the "message size" is mainly mapped to the random access codes belonging to the "cause" of "Other L2/RRC/NAS transmission", so as to enable scheduling according to various message sizes. If the "message size" indicates a large message size (e.g., a message size corresponding to "2" or "3"), the "CQI" is additionally mapped.

In other words, the same additional information (e.g., "random ID") is mapped with different ranges to random access codes belonging to different "causes". That is, the random access codes belonging to the cause of "Detach to active" are mapped to two values of the "random ID", while the random access codes belonging to the cause of "UL sync request only" are mapped to eight values of the "random ID". Similarly, the random access codes belonging to the cause of "Detach to active" are mapped to six values of the "CQI", while the random access codes belonging to the cause of "Other L2/RRC/NAS transmission" are mapped to three values of the "CQI".

In Tables 2 and 3, each value of the "CQI" indicates a channel state (e.g. SNR) within a range. The range of the channel state indicated by each value of the "CQI" is set in advance between the ENB and the UE. Also, each value of the "message size" indicates a message size (bits or bytes) set in advance between the ENB and the UE.

Figure 3:
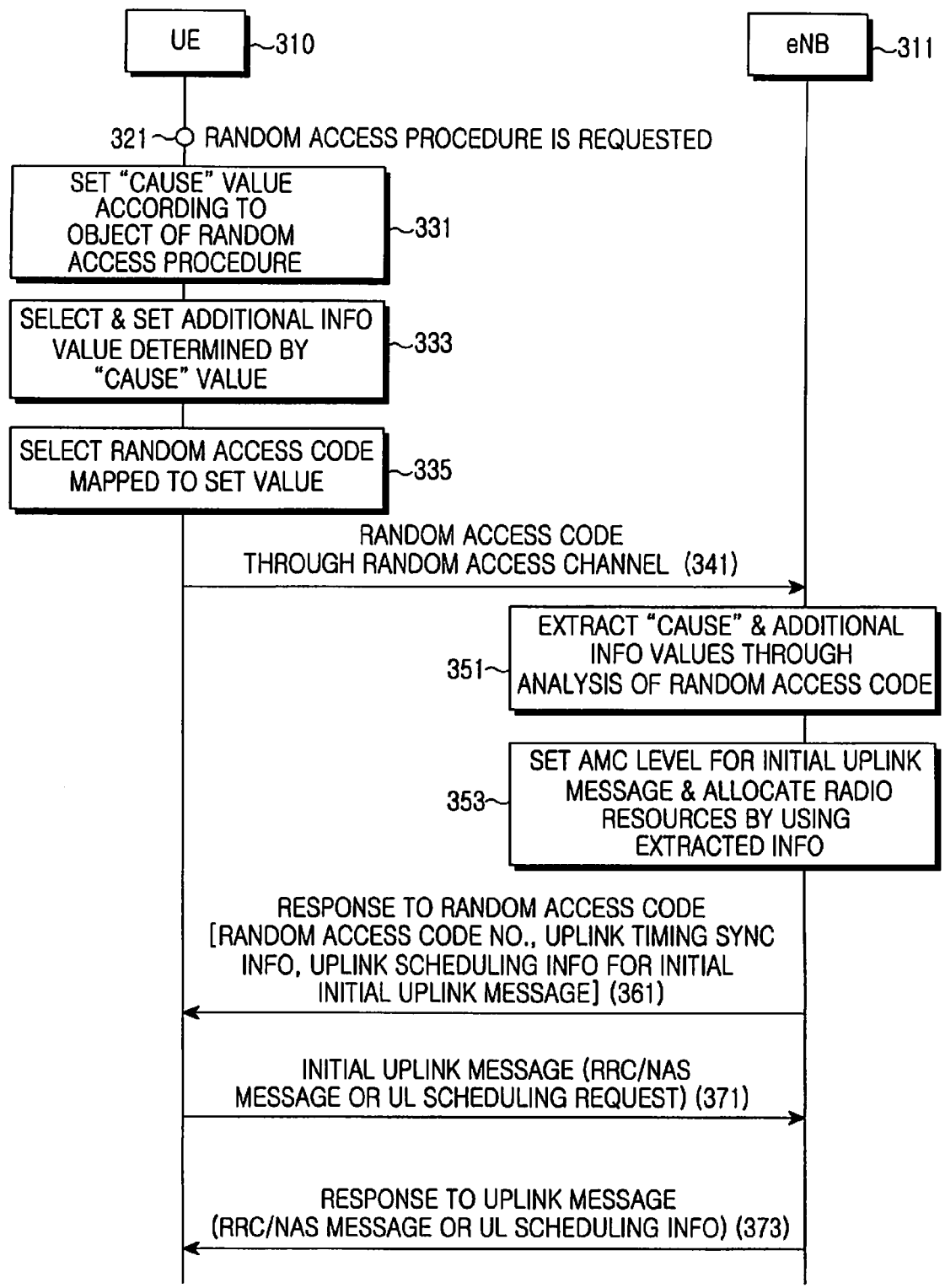
FIG. 3 is a signaling flow diagram illustrating transmission of information using a random access code according to the present invention.

FIG. 3 is a signaling flow diagram illustrating transmission of information using a random access code according to the present invention. In FIG. 3, reference numeral 310 denotes a UE and reference numeral 311 denotes an ENB controlling and managing a cell.

Referring to FIG. 3, a random access procedure is triggered in step 321, wherein the triggering of the random access procedure may be requested by a higher layer or the RRC/MAC/PHY layer. For example, the random access procedure is triggered when the UE 310 in an RRC idle mode tries to start a call, when the UE 310 is powered on, when the UE must perform a Routing Area Update (RAU), when a periodic uplink timing synchronization is acquired, when handover is performed, when a scheduling request is transmitted, or when another RRC/NAS message is transmitted.

Then, in step 331, the UE 310 sets a "cause" value according to an object of the random access procedure. From among "cause" values set in advance between the UE 310 and the ENB 311, a value mapped to the object for which the random access procedure is triggered is selected as the "cause" value to be set. For example, if the UE 310 triggered the random access procedure in order to perform the RAU and if there is a value indicating the RAU from among settable "cause" values known by the UE 310 and the ENB 311, the value is selected.

In step 333, the UE 310 selects at least one additional information element determined by the set "cause" value and sets a value corresponding to the selected additional information. For example, if Table 2 is applied and "RAU" is set as the "cause" value, then the "random ID" is selected as the additional information determined by the "cause" value and one value is selected from among the three "random ID" values. For another example, if Table 3 is applied and "Service Request" is set as the "cause" value, then the "random ID" and "CQI" are selected as the additional information determined by the "cause" value, a value is selected from among the two "random ID" values, and a value mapped to a current channel state of the UE is selected from the six "CQI" values.

In step 333, it is possible to determine the information to be selected, based on a threshold value set in advance between the UE 310 and the ENB 311. For example, when a value is selected from two "random ID" values, the UE 310 may optionally select and set the value. However, when a value is selected from six "CQI" values, the UE 310 may compare a current channel state value with threshold values corresponding to the "CQI" values set in advance between the UE 310 and the ENB 311 and then may set a "CQI" value corresponding to the current channel state. When such threshold values are used between the UE 310 and the ENB 311, either common threshold values for all UEs and all ENBs may be set through a hard coding or the threshold values may be transmitted from the ENB 311 to UEs within a cell through system information broadcasted within the cell.

In step 335, the UE 310 selects a random access code mapped to the set "cause value and an additional information value set for the additional information determined by the "cause" value. For example, if Table 2 is applied, if "RAU" is set as the "cause" value, and if a "random ID" value added by the "cause" value of "RAU" is set as "2", then a random access code corresponding to random access code #10 is selected. As another example, if Table 3 is applied, the "Service Request" is set as the "cause" value, a "random ID" value added by the "cause" value of "Service Request" is set as "0", and a "CQI" value added by the "cause" value of "Service Request" is set as "2", then a random access code corresponding to random access code #14 is selected.

Then, in step 341, the UE 310 transmits the selected random access code through an uplink random access channel determined within the cell. In step 351, the ENB 311 analyzes the random access code, thereby extracting the "cause" and the additional information value according to the "cause". In step 353, by using the extracted information, the ENB performs scheduling, for example, sets an AMC level of an initial uplink message 371 of the UE 310 corresponding to the "cause" of the random access code and allocates radio resources.

For example, if the information obtained through the random access code includes a "cause" of "RAU" and a "random ID" of "2", then the ENB may allocate corresponding radio resources after setting a robust AMC level according to a size of an initial uplink message corresponding to the RAU procedure. The ENB sets the robust AMC level because the ENB did not acquire a "CQI" value and thus cannot recognize the channel state of the UE. For example, if the information obtained through the random access code includes a "cause" of "Service Request", a "random ID" of "2", and a "CQI" of "2", then the ENB may allocate corresponding radio resources after setting an AMC level based on a channel state of the UE corresponding to the "CQI" value of "2" and a size of an initial uplink message corresponding to the "Service Request" procedure.

In step 361, the ENB 311 transmits a random access response to the random access code to the UE 310, thereby reporting such information as uplink timing sync information including calibration information for uplink timing synchronization, random access code number information indicating the random access code and scheduling information for transmission of the initial uplink message, to the UE 310 through the random access response. If the random access response includes a random access code number mapped to the random access code transmitted in step 341, the UE 310 calibrates uplink transmission timing by using the uplink timing sync information included in the random access response and transmits the initial uplink message at channel/time indicated by the scheduling information included in the random access response (step 371). The initial uplink message may be either an RRC message having the ENB as a protocol destination, or a Non Access Stratum (NAS) message having an anchor node as a destination, or a message in which an RRC message and an NAS message are combined, or an uplink scheduling request message of an L2 MAC layer. Then, in step 373, the ENB 311 transmits an RRC/NAS message or uplink scheduling information as a response to the initial uplink message.

Figure 4:
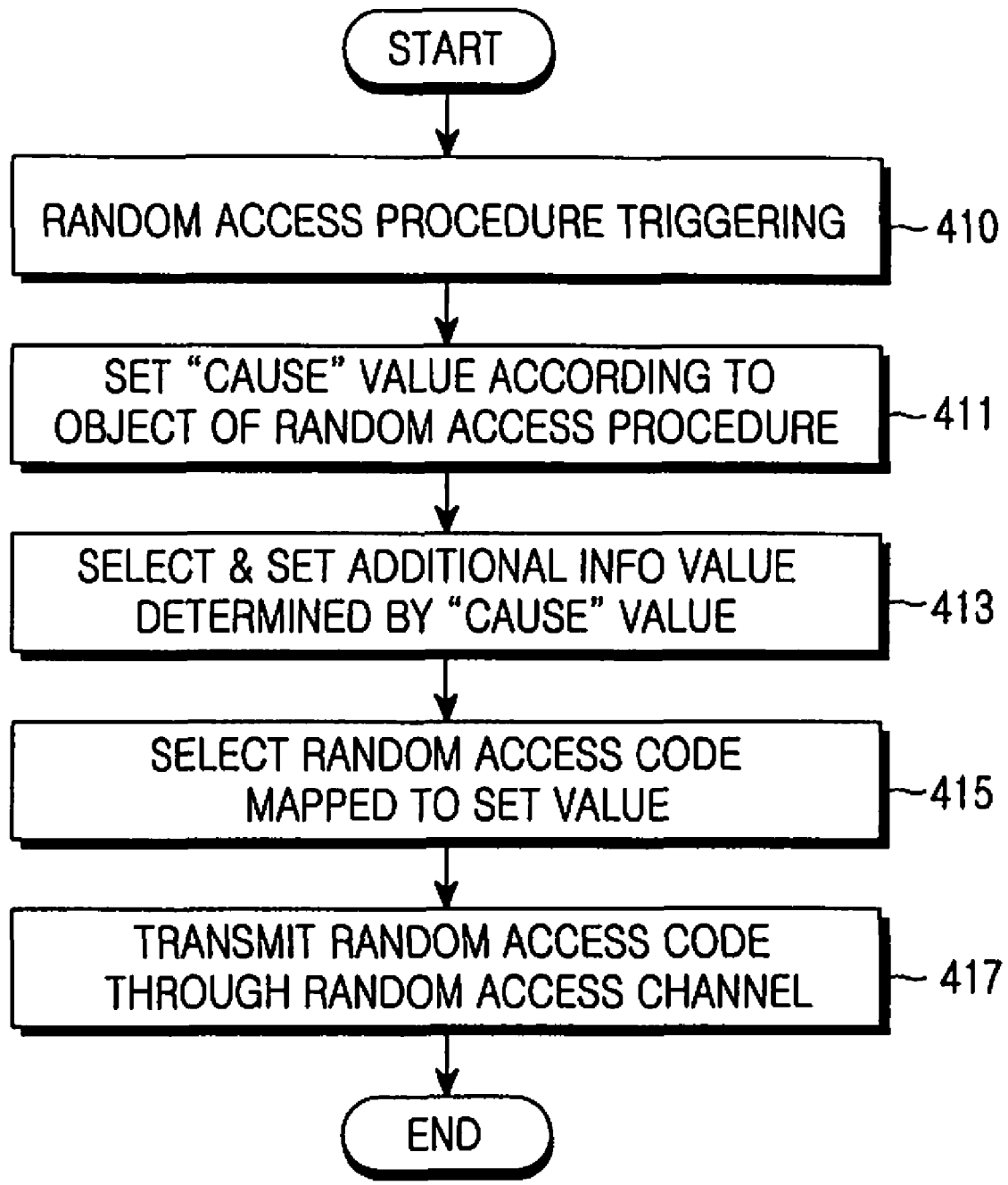
FIG. 4 is a flow diagram illustrating an operation of a UE performing transmission of information using a random access code according to the present invention.

FIG. 4 is a signal flow diagram illustrating an operation of a UE performing transmission of information using a random access code according to the present invention.

Referring to FIG. 4, a random access procedure is triggered in step 410. In step 411, the UE sets the "cause" value according to the object of the random access procedure. As the "cause" value to be set, a value mapped to the object for which the random access procedure is triggered is selected from "cause" values set in advance between the UE and the ENB. For example, if Table 2 or Table 3 is used, a value mapped to the object for which the random access procedure is triggered is set from among the "cause" values including "Detach to active", "Service Request", "UL Sync request only", "RAU", "HO" and "Other L2/RRC/NAS transmission". For example, if the object for which the random access procedure is triggered is "RAU", a value indicating the "RAU" is set as the "cause" value.

In step 413, the UE selects at least one additional information element determined by the set "cause" value and determines a value corresponding to the additional information. In step 415, the UE selects a random access code mapped to the set "cause" value and an additional information value set for the additional information determined by the "cause" value. In step 417, the UE transmits the random access code through an uplink random access channel determined within the cell.

Figure 5:
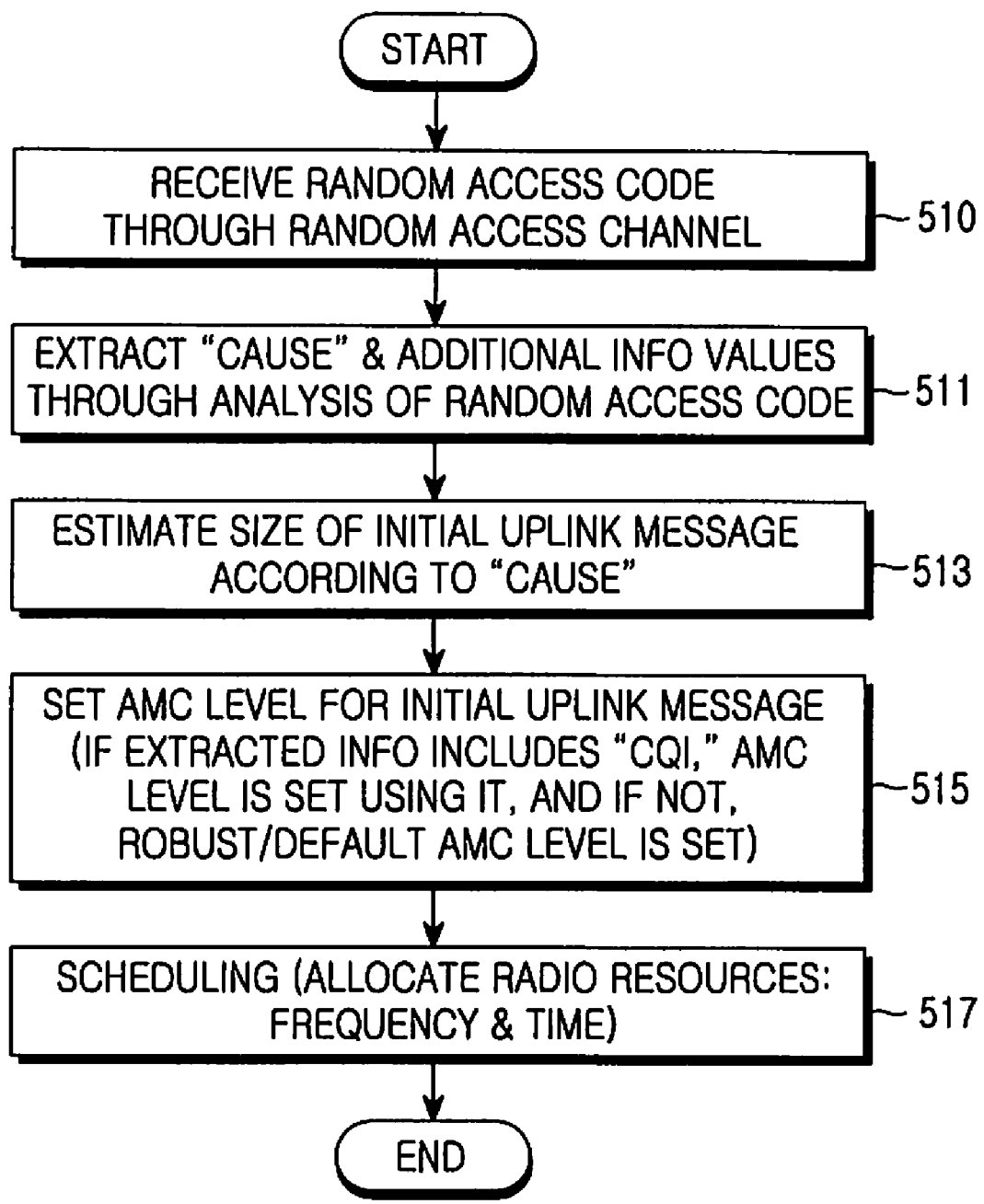
FIG. 5 is a flow diagram illustrating an operation of an ENB performing transmission of information using a random access code according to the present invention.

FIG. 5 is a signal flow diagram illustrating an operation of an ENB performing transmission of information using a random access code according to the present invention.

Referring to FIG. 5, in step 510, the ENB receives a random access code through a random access channel from a UE. In step 511, the ENB analyzes the random access code, thereby extracting the "cause" and the additional information value according to the "cause". In step 513, the ENB estimates the size of the initial uplink message to be transmitted by the UE, according to the extracted "cause". For example, if the "cause" is RAU, the ENB estimates the size by using the initial uplink message corresponding to the RAU. As another example, if the "cause" is "Other L2/RRC/NAS transmission", the ENB estimates the size based on the "message size" indicated by the random access code.

In step 515, the ENB sets an AMC level of the initial uplink message. Here, if the extracted additional information includes a "CQI" value, the ENB estimates the channel state of the UE by using the "CQI" and adaptively sets the AMC level based on the estimated channel state. In contrast, if the extracted additional information does not include a "CQI" value, the ENB cannot estimate the channel state of the UE and thus can set the AMC level to the robust AMC level or default AMC level. In step 517, the ENB performs scheduling by using the estimated size and AMC level, thereby allocating radio resources of the frequency domain and time domain for transmission of the initial uplink message.

Figure 6:
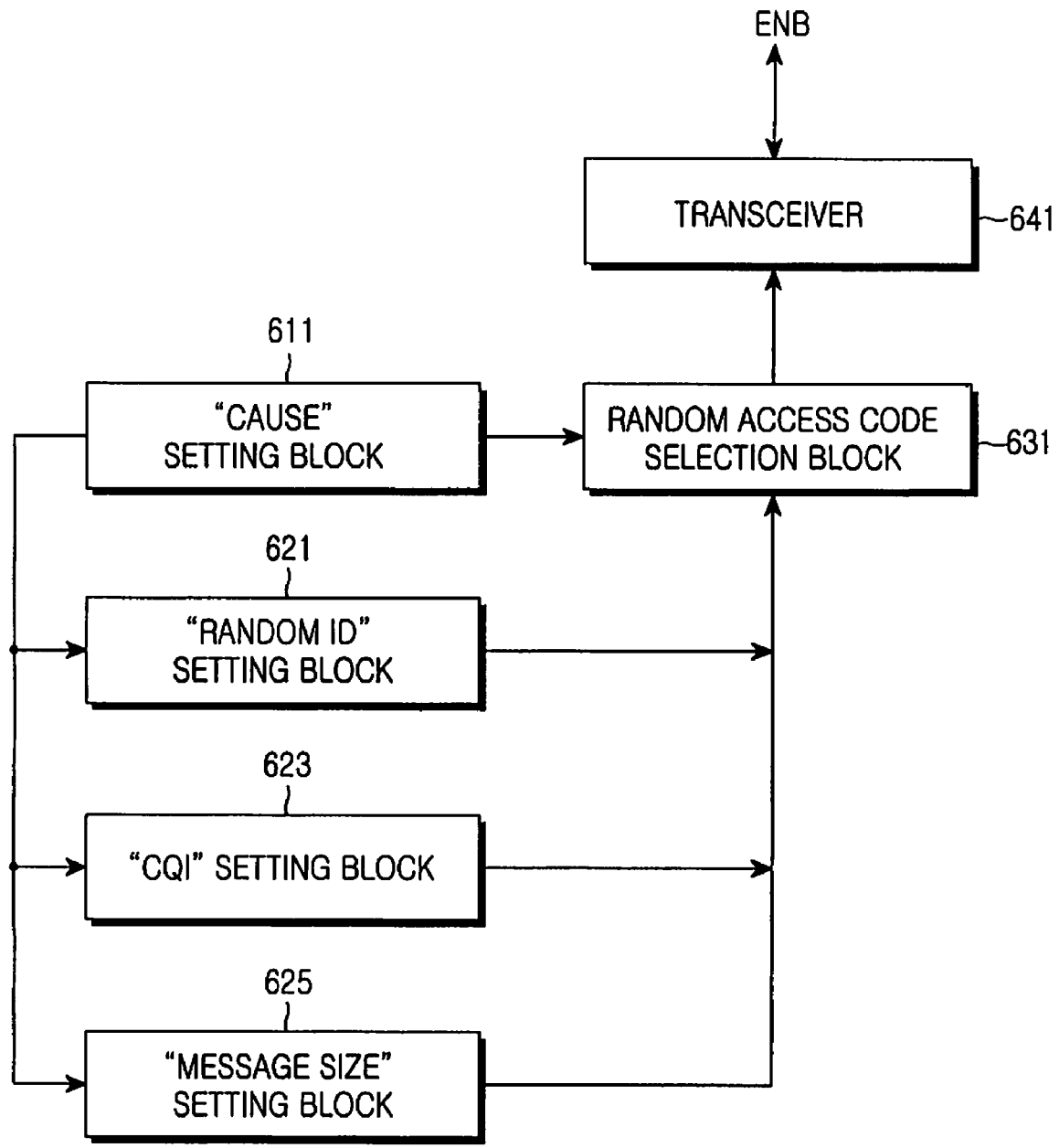
FIG. 6 is a block diagram illustrating a structure of a UE for transmitting information using a random access code according to the present invention.

FIG. 6 is a block diagram illustrating a structure of a UE for transmitting information using a random access code according to the present invention.

Referring to FIG. 6, a controller for a random access procedure includes a plurality of blocks 611, 621, 623, 625 and 631. Block 611 corresponds to a "cause" setting block for setting a "cause" value indicating an object for which the random access procedure is generated. Block 621 corresponds to a "random ID" setting block for setting a "random ID" value, block 623 corresponds to a "CQI" setting block for setting a "CQI" value according to a current channel state of the UE and the block 625 corresponds to a "message size" setting block for setting a "message size" value according to a size of the initial uplink message. Blocks 621, 623, and 625 determine whether to set additional information and at what level it will set the additional information, based on the "cause" value set by the "cause" setting block 611.

For example, if the random access codes of Table 2 are applied and the "cause" setting block 611 sets "RAU" as the "cause" value, then the "random ID" setting block 621 sets one value from among the three "random ID" values. At this time, other setting blocks 623 and 625 do not set any additional information. As another example, if the random access codes of Table 3 are applied and the "cause" setting block 611 sets "Service Request" as the "cause" value, then the "random ID" setting block 621 sets one value selected from among the two "random ID" values, and the "CQI" setting block 623 sets one value mapped to a current channel state of the UE from among the six "CQI" values by referring to the current channel state of the UE. At this time, the "message size" setting block 625 does not set any additional information.

When the "cause" setting block 611 has set the "cause" value and the other setting blocks 621, 623 and 625 has set additional information values according to the "cause" value, the set values are input to the random access code selection block 631. Then, the random access code selection block 631 selects a random access code mapped to at least one of the input values. The random access code selected by the random access code selection block 631 is transmitted by the transceiver 641 to the ENB through a random access channel within the cell.

Figure 7:
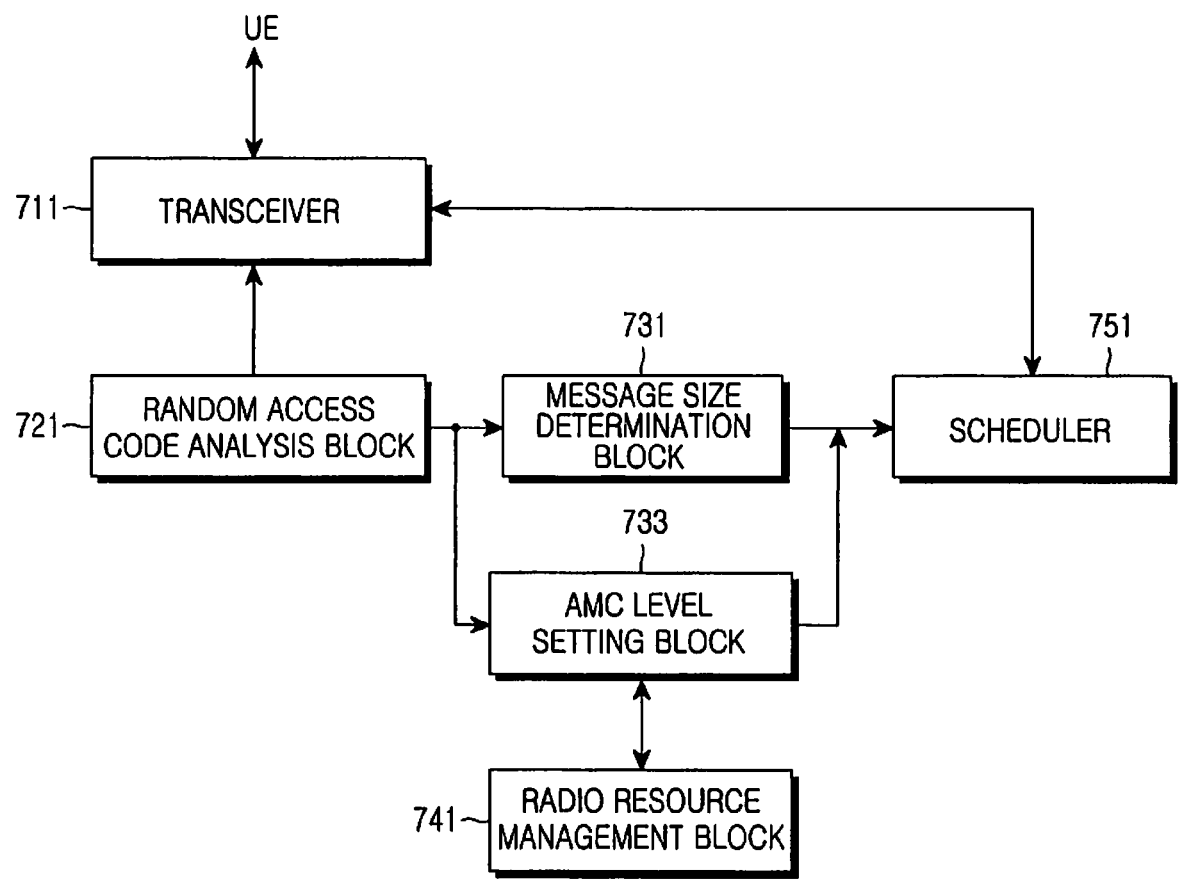
FIG. 7 is a block diagram illustrating a structure of an ENB for transmitting information using a random access code according to the present invention.

FIG. 7 is a block diagram illustrating a structure of an ENB for transmitting information using a random access code according to the present invention.

Referring to FIG. 7, a controller for a random access procedure includes a plurality of blocks 721, 731, 733 and 741. By using a random access code received by the transceiver 711 from a UE through a random access channel, the random access code analysis block 721 acquires the "cause" value mapped to the random access code and the additional information included according to the "cause" value. The "cause" value and the additional information included according to the "cause" value acquired by the random access code analysis block 721 correspond to information on the initial uplink message and may be input to the message size determination block 731 and the AMC level setting block 733.

For example, the additional information including the "cause" value and the "message size" may be input to the message size determination block 731 and the additional information of the "CQI" may be input to the AMC level setting block 733. If the random access code analysis block 721 has failed to acquire the additional information of the "CQI", the AMC level setting block 733 sets the robust/default AMC level. The AMC level setting block 733 exchanges information with the radio resource management block 741. When setting of the message size and the AMC level by the message size determination block 731 and the AMC level setting block 733 is completed, the scheduler 751 performs scheduling according to the message size and the AMC level. The transceiver 711 transmits a random access response, such as uplink scheduling information indicating radio resources allocated by the scheduler 751, to the UE, and then receives an initial uplink message from the UE by using the radio resources.

According to the present invention, it is possible to efficiently transmit and receive information through a random access procedure in a mobile communication system using a Node B scheduling. Further, by changing the type of the additional information elements mapped to the random access codes according to the cause of the random access procedure, it is possible to transmit a larger quantity of additional information by using a smaller number of random access codes.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for transmitting information through a random access procedure in a mobile communication system, the method comprising the steps of:
   setting, when the random access procedure is triggered, a cause value according to an object for which the random access procedure is triggered;
   determining at least one additional information element to be notified through the random access procedure based on a class of the cause from among classes of the cause, and selecting a random access code mapped to the cause and the determined additional information element by referring to a random access code table; and
   transmitting the random access code to an Evolved Node B (ENB) through a random access channel, wherein, in the random access code table, random access codes belonging to a first class from among the classes of the cause and random access codes belonging to a second class are mapped to different combinations of additional information elements, and first additional information elements from among the mapped additional information elements are mapped with different ranges to the random access codes belonging to the first class and the random access codes belonging to the second class.

2. The method as claimed in claim 1, wherein the classes of the cause are classified based on at least one of a possibility of contention of the random access procedure and a message size of an initial uplink message to be transmitted by the random access procedure.

3. The method as claimed in claim 1, wherein the additional information elements include at least one of a random IDentifier (ID) for preventing contention of the random access procedure, Channel Quality Information (CQI) indicating a downlink channel state, and a message size of an initial uplink message to be transmitted through an uplink by the random access procedure.

4. The method as claimed in claim 3, wherein, from among the classes of the cause, a cause for a random access procedure triggered in order to transmit an initial uplink message having a relatively large size or an initial uplink message having a relatively low possibility of contention between User Equipments (UEs) is mapped to a CQI indicating a downlink channel state.

5. The method as claimed in claim 3, wherein, from among the classes of the cause, a cause for a random access procedure triggered in order to transmit an initial uplink message having a relatively small size or an initial uplink message having a relatively high possibility of contention between UEs is mapped to a random ID for preventing contention of the random access procedure.

6. The method as claimed in claim 3, wherein, from among the classes of the cause, a cause indicating a random access procedure triggered in order to transmit an initial uplink message having various message sizes is mapped to a message size of the initial uplink message.

7. The method as claimed in claim 1, wherein the cause indicates at least one of Detach to active, Service Request, UL Sync request only, RAU (Routing Area Update), "HO (HandOver) and Other Layer 2 (L2)/Radio Resource Control (RRC)/ Non Access Stratum (NAS) transmission.

8. The method as claimed in claim 1, further comprising the steps of:
receiving a random access code number, uplink timing synchronization (sync) information, uplink scheduling information of an initial uplink message from the ENB as a response to transmission of the random access code; and
calibrating, when the received random access code indicates the transmitted random access code, uplink timing based on the uplink timing sync information and then transmitting the initial uplink message based on the uplink scheduling information.

9. A method for receiving information through a random access procedure in a mobile communication system, the method comprising the steps of:
receiving a random access code through a random access channel from a User Equipment (UE);
analyzing the random access code by referring to a random access code table, thereby extracting at least one information element and a cause indicated by the random access code;
determining scheduling information for transmission of the initial uplink message based on the at least one information element and the cause; and
transmitting the scheduling information to the UE,
wherein, in the random access code table, random access codes belonging to a first class from among classes of the cause and random access codes belonging to a second class are mapped to different combinations of additional information elements, and first additional information elements from among the mapped additional information elements are mapped with different ranges to the random access codes belonging to the first class and the random access codes belonging to the second class.

10. The method as claimed in claim 9, wherein the classes of the cause are classified based on at least one of a possibility of contention of the random access procedure and a message size of an initial uplink message to be transmitted by the random access procedure.

11. The method as claimed in claim 9, wherein the additional information elements include at least one of a random IDentifier (ID) for preventing contention of the random access procedure, Channel Quality Information (CQI) indicating a downlink channel state and a message size of an initial uplink message to be transmitted through an uplink by the random access procedure.

12. The method as claimed in claim 11, wherein, from among the classes of the cause, a cause for a random access procedure triggered in order to transmit an initial uplink message having a large size or an initial uplink message having a low possibility of contention between User Equipments (UEs) is mapped to a CQI indicating a downlink channel state.

13. The method as claimed in claim 11, wherein, from among the classes of the cause, a cause for a random access procedure triggered in order to transmit an initial uplink message having a small size or an initial uplink message having a high possibility of contention between UEs is mapped to a random ID for preventing contention of the random access procedure.

14. The method as claimed in claim 11, wherein, from among the classes of the cause, a cause indicating a random access procedure triggered in order to transmit an initial uplink message having various message sizes is mapped to a message size of the initial uplink message.

15. The method as claimed in claim 9, wherein the cause indicates at least one of Detach to active, Service Request, UpLink (UL) Synchronization (Sync) request only, "Routing Area Update (RAU), HO (HandOver) and Other Layer 2 (L2)/Radio Resource Control (RRC)/Non Access Stratum (NAS) transmission.

16. A User Equipment (UE) apparatus for transmitting information through a random access procedure in a mobile communication system, the UE apparatus comprising:
a cause setting unit for, when the random access procedure is triggered, setting a cause value according to an object for which the random access procedure is triggered;
an additional information setting unit for determining at least one additional information element to be notified through the random access procedure based on a class of the cause from among classes of the cause;
a random access code selection unit for selecting a random access code mapped to the additional information element and the cause by referring to a random access code table; and
a transmitter for transmitting the random access code to an Evolved Node B (ENB) through a random access channel, wherein, in the random access code table, random access codes belonging to a first class from among the classes of the cause and random access codes belonging to a second class are mapped to different combinations of additional information elements, and first additional information elements from among the mapped additional information elements are mapped with different ranges to the random access codes belonging to the first class and the random access codes belonging to the second class.

17. The UE apparatus as claimed in claim 16, wherein the classes of the cause are classified based on at least one of a possibility of contention of the random access procedure and a message size of an initial uplink message to be transmitted by the random access procedure.

18. The UE apparatus as claimed in claim 16, wherein the additional information elements include at least one of a random IDentifier (ID) for preventing contention of the random access procedure, Channel Quality Information (CQI) indicating a downlink channel state and a message size of an initial uplink message to be transmitted through an uplink by the random access procedure.

19. The UE apparatus as claimed in claim 18, wherein, from among the classes of the cause, a cause for a random access procedure triggered in order to transmit an initial uplink message having a large size or an initial uplink message having a low possibility of contention between User Equipments (UEs) is mapped to a CQI indicating a downlink channel state.

20. The UE apparatus as claimed in claim 18, wherein, from among the classes of the cause, a cause for a random access procedure triggered in order to transmit an initial uplink message having a small size or an initial uplink message having a high possibility of contention between UEs is mapped to a random ID for preventing contention of the random access procedure.

21. The UE apparatus as claimed in claim 18, wherein, from among the classes of the cause, a cause indicating a random access procedure triggered in order to transmit an initial uplink message having various message sizes is mapped to a message size of the initial uplink message.

22. The UE apparatus as claimed in claim 16, wherein the cause indicates at least one of Detach to active, Service Request, UpLink (UL) Synchronization (Sync) request only, RAU (Routing Area Update), HO (Handover)," and "Other Layer 2 (L2)/RRC/NAS transmission."

23. The UE apparatus as claimed in claim 16, wherein, when the transmitter receives a random access code number, uplink timing sync information, and uplink scheduling information of an initial uplink message from the ENB as a response to transmission of the random access code, and when the received random access code indicates the transmitted random access code, the transmitter transmits the initial uplink message based on the uplink scheduling information by using uplink timing calibrated based on the uplink timing sync information.

24. An Evolved Node B (ENB) apparatus for receiving information through a random access procedure in a mobile communication system, the ENB apparatus comprising:
a receiver for receiving a random access code through a random access channel from a User Equipment (UE);
a random access code analysis unit for analyzing the random access code by referring to a random access code table, thereby extracting at least one information element and a cause indicated by the random access code; and
a scheduler for determining scheduling information for transmission of the initial uplink message based on the at least one information element and the cause,
wherein, in the random access code table, random access codes belonging to a first class from among classes of the cause and random access codes belonging to a second class are mapped to different combinations of additional information elements, and first additional information elements from among the mapped additional information elements are mapped with different ranges to the random access codes belonging to the first class and the random access codes belonging to the second class.

25. The ENB apparatus as claimed in claim 24, wherein the classes of the cause are classified based on at least one of a possibility of contention of the random access procedure and a message size of an initial uplink message to be transmitted by the random access procedure.

26. The ENB apparatus as claimed in claim 24, wherein the additional information elements include at least one of a random IDentifier (ID) for preventing contention of the random access procedure, Channel Quality Information (CQI) indicating a downlink channel state and a message size of an initial uplink message to be transmitted through an uplink by the random access procedure.

27. The ENB apparatus as claimed in claim 26, wherein, from among the classes of the cause, a cause for a random access procedure triggered in order to transmit an initial uplink message having a large size or an initial uplink message having a low possibility of contention between User Equipments (UEs) is mapped to a CQI indicating a downlink channel state.

28. The ENB apparatus as claimed in claim 26, wherein, from among the classes of the cause, a cause for a random access procedure triggered in order to transmit an initial uplink message having a small size or an initial uplink message having a high possibility of contention between UEs is mapped to a random ID for preventing contention of the random access procedure.

29. The ENB apparatus as claimed in claim 26, wherein, from among the classes of the cause, a cause indicating a random access procedure triggered in order to transmit an initial uplink message having various message sizes is mapped to a message size of the initial uplink message.

30. The ENB apparatus as claimed in claim 24, wherein the cause indicates at least one of Detach to active, Service Request, UpLink (UL) Sync request only, Routing Area Update (RAU), Handover (HO) and Other Layer 2 (L2)/Radio Resource Control (RRC)/Non Access Stratum (NAS) transmission.

* * * * *